United States Patent [19]

Hetz

[11] 4,364,736

[45] Dec. 21, 1982

[54] PULLEY AND METHOD OF MAKING SAME

[75] Inventor: G. Brian Hetz, Springfield, Mo.

[73] Assignee: Dayco Corporation, Dayton, Ohio

[21] Appl. No.: 156,450

[22] Filed: Jun. 4, 1980

[51] Int. Cl.³ .................... F16H 55/36; F16H 55/52

[52] U.S. Cl. ................................... 474/168; 474/170; 474/238

[58] Field of Search ............... 474/168, 169, 170, 246, 474/247, 238; 29/159 R

[56] References Cited

U.S. PATENT DOCUMENTS

| | | | |
|---|---|---|---|
| 1,983,844 | 12/1934 | Evenburgh | 474/168 |
| 2,427,172 | 9/1947 | Williams | 474/168 |
| 2,495,459 | 1/1950 | Kessler | 474/170 |
| 2,548,387 | 4/1951 | May | 474/168 |
| 2,553,791 | 5/1951 | Smith | 474/169 |
| 2,632,333 | 3/1953 | Eller | 474/168 |
| 2,632,334 | 3/1953 | Williams | 474/168 X |
| 2,633,751 | 4/1953 | Browning | 474/168 |
| 2,728,239 | 12/1955 | Adams | 474/246 |
| 2,779,202 | 1/1957 | Jackson | 474/168 |
| 3,367,199 | 2/1968 | Dankowski | 474/168 |

FOREIGN PATENT DOCUMENTS

| | | | |
|---|---|---|---|
| 659699 | 10/1951 | United Kingdom . | |
| 691019 | 5/1953 | United Kingdom | 474/168 |

*Primary Examiner*—Rodney H. Bonck
*Attorney, Agent, or Firm*—Joseph V. Tassone

[57] ABSTRACT

A pulley and method of making same are provided wherein such pulley has a plurality of annular grooves for receiving a power transmission belt which has a corresponding plurality of belt elements. The pulley comprises a pair of side flanges, each having a belt element supporting side wall and at least one annular rib between the flanges. Such rib has belt element supporting side walls and side flanges which are separate substantially identical parts that are interchangeable on the pulley from side to side. The rib is disposed in sandwiched relation between the side flanges, with the flanges and rib being fastened together to define a pulley.

10 Claims, 9 Drawing Figures

PULLEY AND METHOD OF MAKING SAME

BACKGROUND OF THE INVENTION

1. Field of the Invention

This invention relates to pulleys and in particular to multiple groove pulleys for multiple-element endless power transmission belts made primarily of polymeric material.

2. Prior Art Statement

Power transmission belts made primarily of polymeric material and wherein each has a plurality of integral longitudinally extending belt elements are well known and widely used in industry. However, the present practice is to require special pulleys for each particular type of belt whereby the cost of the resulting power transmission system is increased.

One type of multiple element polymeric belt which has been standardized by the belt industry is a so-called V-ribbed belt which has the usual tension section and load-carrying section and wherein the compression section thereof has a plurality of longitudinally extending ribs each of V-shaped cross-sectional configuration. V-ribbed belts of this type are described in Engineering Standard Publication IP-26 for V-ribbed belts (H, J, K, L, and M cross sections) c. 1977 by The Rubber Manufacturers Association, Inc., 1901 Pennsylvania Avenue; Washington, D. C. 20006. One common feature of the belts having H through M cross sections is that each V-shaped rib thereof has an included angle of 40° between its outside surfaces yet each of these belts has a different center spacing between immediately adjacent ribs.

In using V-ribbed belts it will be appreciated that the number of belt elements provided on a belt will vary whereby the previous practice has been to provide special pulleys for each belt used as a function of the number of belt elements. In addition, each belt cross section L through M requires special pulleys even when the number of belt elements is the same from one type of belt cross section to another. Accordingly, it would be desirable to provide a pulley construction for V-ribbed belts which would have at least parts thereof useable with more than one particular V-ribbed belt.

A pulley construction has been proposed heretofore which utilizes a number of so-called stock sections to define a pulley having a plurality of grooves and such pulley construction is disclosed in U.S. Pat. No. 2,632,333. The teaching of this patent appears to be provision of a pulley which permits a wide variation in groove size to fit individual belts.

SUMMARY

It is a feature of this invention to provide a pulley for V-ribbed belts, or the like, which is of simple and economical construction and which has portions thereof useable with a plurality of types of belts each having a plurality of belt elements.

Another feature of this invention is to provide a pulley of the character mentioned wherein the pulley comprises a pair of side flanges each having a belt element supporting side wall and annular rib means between the flanges, with the rib means having belt element supporting side walls. The side flanges are separate substantially identical parts which are interchangeable on the pulley from side to side, and the rib means is disposed in sandwiched relation between the side flanges. The flanges and rib means are detachably fastened together to define a pulley.

Another feature of this invention is to provide a pulley of the character mentioned in which the rib means thereof comprises an annular member having at least one pair of belt element supporting side walls and a simple right circular cylindrical bore therethrough.

Another feature of this invention is to provide a pulley of the character mentioned in which the rib means thereof comprises an annular member having a plurality of pairs of belt element supporting side walls.

Another feature of this invention is to provide a pulley of the character mentioned in which the rib means thereof comprises a plurality of annular members each having at least one pair of belt element supporting side walls.

Another feature of this invention is to provide a pulley of the character mentioned in which the rib means thereof is of optimum simplicity and is a circular disc-like structure having belt element supporting side walls defining the circumference thereof. The structure has a simple right circular cylindrical bore therethrough with the cylindrical surface defining the bore serving as a positioning surface.

Another feature of this invention is to provide a pulley of the character mentioned wherein the disc-like structure has a plurality of openings disposed concentrically around its bore with the openings being used to fasten the rib means between its associated side flanges.

Another feature of this invention is to provide a pulley of the character mentioned wherein the side flanges thereof are particularly adapted to be used with all standard V-ribbed belts of H through M cross section.

Another feature of this invention is to provide a pulley of the character mentioned in which all components of the pulley are made of metallic material.

Another feature of this invention is to provide a pulley of the character mentioned in which various ones of the side flanges, rib means, and fastening means for the rib means and flanges may be made of metallic material or synthetic plastic material.

Another feature of this invention is to provide an improved method of making a pulley of the character mentioned.

Therefore, it is an object of this invention to provide an improved pulley and method of making same having one or more of the novel features set forth above or hereinafter shown or described.

Other details, features, uses, objects, and advantages of this invention will become apparent from the embodiment thereof presented in the following specification, claims, and drawings.

BRIEF DESCRIPTION OF THE DRAWINGS

The accompanying drawings show present preferred embodiments of this invention, in which.

DETAILED DESCRIPTION

Figure 1:
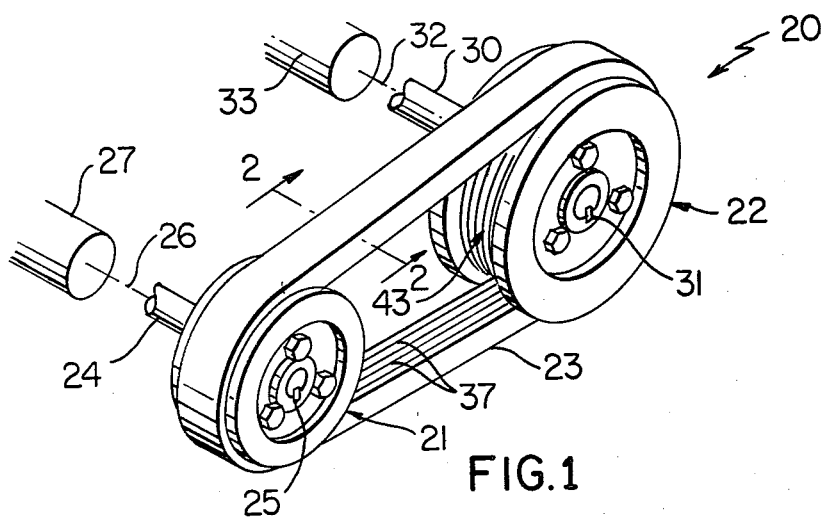
FIG. 1 is a perspective view with parts broken away and parts shown schematically particularly illustrating a belt drive system which utilizes an endless V-ribbed power transmission belt and a pair of pulleys in accordance with the teachings of this invention.
Figure 2:
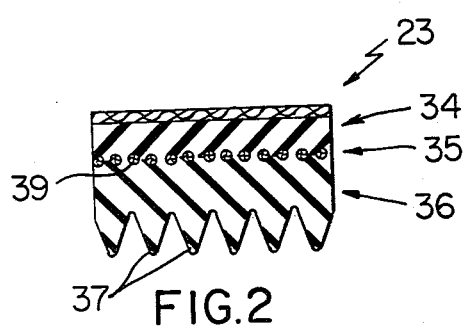
FIG. 2 is a cross-sectional view of the belt taken essentially on the line 2—2 of FIG. 1.

Reference is now made to FIG. 1 of the drawings which illustrates an exemplary power transmission system which is designated generally by the reference numeral 20; and, such power transmission system comprises a pair of pulleys shown as a driver or driving pulley 21 and a driven pulley 22, each of which is made in accordance with the teachings of this invention. The pulleys 21-22 have an endless power transmission belt 23 disposed therearound and in operative engagement therewith, for the purpose of transmitting power from the driving pulley 21 to the driven pulley 22.

The driving pulley 21 has a shaft 24 suitably keyed thereto by a key 25 and the shaft 24 is operatively connected by a mechanical connection, shown schematically by a dot-dash line 26, to a drive motor which may be in the form of an electrically powered drive motor 27. Power is transmitted from the motor 27 and pulley 21 to the pulley 22 by the belt 23. The pulley 22 has a driven shaft 30 keyed thereto by a key 31 and the driven shaft 30 is connected by a mechanical connection, shown schematically by a dot-dash line 32 to a load 33 which is to be driven or rotated in this instance.

The ribbed power transmission belt 23 may be of any suitable type known in the art; however, in this example such belt is a so-called V-ribbed endless belt which has the V-ribs or its compression section of standard known configuration for a V-ribbed belt, essentially as disclosed in the above-mentioned Publication No. IP-26. The remainder of the belt is drawn to an exaggerated thickness for ease of drawing presentation and description.

The belt 23 has a tension section 34, a load-carrying section 35 which is comprised primarily of a helically wound load-carrying cord 39, and a compression section 36 which includes a plurality of integral longitudinally extending belt elements or ribs. This is designated by the same reference numeral 37 and with only a representative few of such ribs being thus designated. Each rib 37 is a V-shaped rib and is known in the art the belt 23 provides optimum traction when utilized in an associated pulley.

Figure 3:
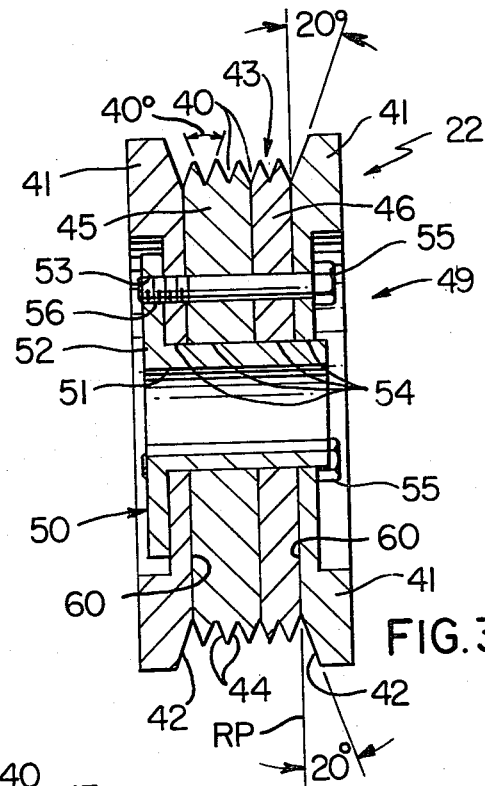
FIG. 3 is a view showing the pulley at the right side of FIG. 1 with parts in cross-section and parts in elevation and with such pulley being shown minus its supporting shaft and minus its power transmission belt.

Reference is now made to FIG. 3 of the drawings which illustrates the exemplary pulley 22 minus its shaft 30 and belt 23. The pulley 22 is substantially identical to the pulley 21, except for dimensional size, and has corresponding substantially identical components whereby the description of the components of the pulley 22 is essentially the same as the description of corresponding components of the pulley 21. Only pulley 22 will be described in detail.

The pulley 22 has a plurality, six in this example, of annular grooves 40 for receiving the corresponding six V-shaped ribs 37 of the V-ribbed belt 23. The grooves 40 are also V-shaped and correspond to the V-shape of the ribs 37.

The pulley 22 comprises a pair of side flanges each designated by the same reference numeral 41 and each flange 41 has a belt element supporting side wall 42. The pulley 22 also has annular rib means, designated generally by the reference numeral 43, disposed between the side flanges 41. The rib means has belt element supporting side walls each designated by the same reference numeral 44 with only a few representative ones of such belt element supporting side walls being thus designated.

In accordance with the teachings of this invention, the side flanges 41 are substantially identical parts and thus are interchangeable on the pulley from side to side. The rib means 43 is disposed in sandwiched relation between the side flanges 41 and means designated generally by the reference numeral 49 is provided for detachably fastening the flanges 41 and rib means 43 together to define the pulley 22.

The rib means 43 in this example comprises a plurality of annular members 45 and 46. Each annular member 45 and 46 has at least one pair of belt element supporting side walls 44 and in this example each member 45 and 46 has a plurality of pairs of belt element supporting side walls again designated by the same reference numeral 44.

Each belt element supporting side wall 42 of each flange 41 is disposed at an inclined angle of 20° from a reference vertical plane RP, FIG. 3. In addition, each belt element supporting side wall 44 of each rib means 43 and in particular of each member 45 and 46 comprising the rib means 43 is also disposed at an inclined angle of 20° from the reference plane RP.

Figure 8:
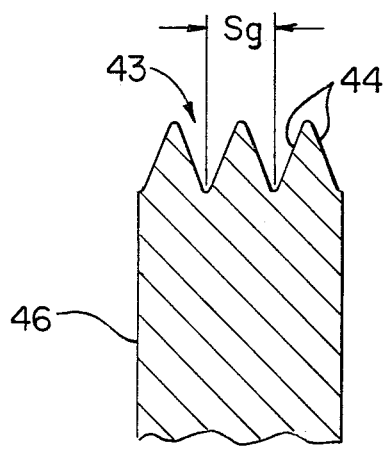
FIG. 8 is an enlarged cross-sectional view particularly illustrating belt element supporting walls of the pulley of FIG. 5.

The rib means 43 has a perpendicular distance between parallel planes through the base portion of each adjoining pair of belt element supporting side walls 44 which is designated by the reference letter Sg (FIG. 8). This distance Sg also defines the spacing between immediately adjacent grooves of the pulley 22. This designation Sg for distance or spacing has been used because it is a standard designation for V-ribbed belts and their V-grooved pulleys. Each belt element supporting side wall 42 of each flange 41 is inclined at an angle of 20° from the reference plane RP, and each belt element supporting side wall of the rib means 43 is similarly inclined at an angle of 20° from the reference plane RP. Thus the included angle (which is popularly referred to as the groove angle) is 40°. This 40° angle is the standard angle for V-ribbed belts and likewise is the standard angle for each V-shaped groove 40.

V-ribbed belts also have a 40° included angle between the faces of each V-shaped belt element, regardless of the spacing between elements. It is therefore possible to use the side flanges 41 (wherein each has a supporting side wall inclined at an angle of 20° from a reference plane) to define side flanges for pulleys used with all V-ribbed belts of a standard H, J, K, L, and M cross section. The rib means 43 for each pulley will be selected depending on the belt cross section involved.

Figure 4:
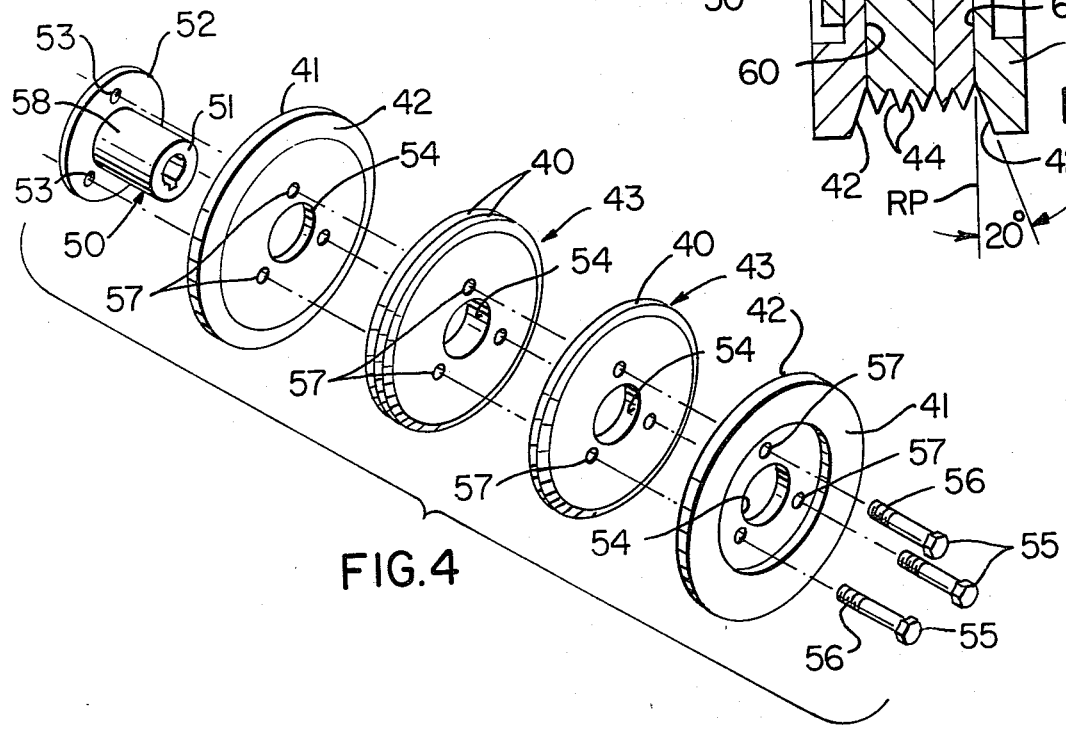
FIG. 4 is an exploded perspective view of the pulley of FIG. 3.

As previously indicated, the pulley 22 has means 49 detachably fastening the flanges 41 and rib means 43 together. The fastening means 49 comprises a hub 50 (FIG. 4) which has a tubular central portion 51 which is particularly adapted to extend through associated side flanges 41 and rib means 43 associated with said flanges 41 for each particular application. In this example, the central portion 51 extends through members 45 and 46 defining the rib means 43 of the pulley 22. The hub 50 also has a hub flange 52 which extends radially from the central portion 51 and hub flange 52 has a plurality of three threaded openings 53 therein which are disposed 120° apart on a common circumference and for a purpose to be subsequently described.

Each side flange 41 is of optimum simplicity and has a right circular cylindrical bore 54 provided centrally therethrough. Each member 45 and 46, which define the rib means 43, each has a right circular cylindrical bore therethrough, with each of such bores being also designated by the reference numeral 54.

The fastening means 49 comprises a plurality of three threaded bolts 55 and each of the bolts has a threaded outer end 56 which is particularly adapted to be threadedly received in an associated threaded opening 53. The fastening means 49 also comprises a plurality of three openings 57 in each flange 41 and in each member 45 and 46 and the openings 57 are adapted to receive bolts 55 therethrough. The openings 57 in each member 41 and 45-46 are also disposed 120° apart and on a common circumference which has a diameter which is equal to the diameter of the common circumference for the threaded openings 53.

The central portion 51 of the hub 50 also has a right circular cylindrical outside surface 58 of an outside diameter which is dimensioned slightly less than the diameter of each bore 54. The pulley 22 is readily assembled by first inserting portion 51 through bore 54 of a side flange 41, followed by insertion of such portion through bores 54 of members 45 and 46, and then followed by insertion through the bore 54 of the opposite side flange 41. The members 41 and 45-46 are then relatively rotated about the outside surface 58 of central portion 51, which serves as a positioning surface, until the openings 57 are axially aligned with the threaded openings 53. The bolts 55 are extended through the openings 57 and the threaded ends 56 of such bolts are threaded into threaded engagement with the threaded openings 53 whereby flanges 41 and rib means 43 are detachably fastened together to define pulley 22.

Figure 5:
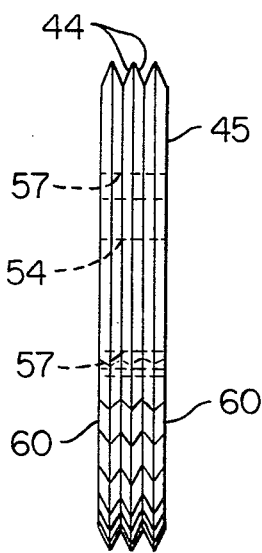
FIGS. 5, 6, and 7 are end views of typical rib means which may comprise the pulleys of FIG. 1.
Figure 6:
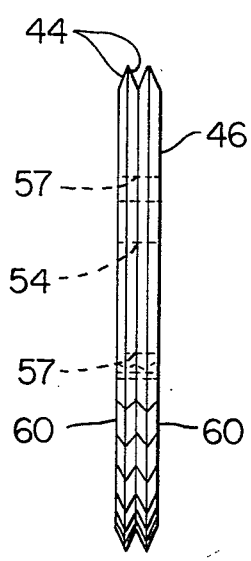

The rib means 43 comprising pulley 22 in this example of the invention, is defined by a pair annular members 45 and 46 which are illustrated in enlarged views in FIGS. 5 and 6 of the drawings respectively. The annular member 45 has a plurality of three pairs of belt element supporting side walls 44 while the member 46 has a plurality of two pairs of belt element supporting side walls 44. Each of these members 45 and 46 has opposed planar surfaces designated by the same reference numeral 60. Such surfaces are precisely defined and enable each member 45 and 46 to be sandwiched between associated side flanges 41 of the pulley 22 so as to assure provision of a precise groove 40 between its outer inclined surfaces 44 and adjoining members. Each side flange 41 also has a precisely defined planar surface also designated by the reference numeral 60 which is adapted to engage associated rib means. The inclined surface 42 of the flange cooperates with an outer surface 44 of adjoining rib means to likewise define a precise groove 40.

Each annular member 45 and 46 has a plurality of pairs of belt element supporting side walls. However, the annular member 61 illustrated in FIG. 7 has only a single pair of belt element supporting side walls 44. The annular member 61 also has planar surfaces 60 defining its opposite sides which are provided for the same purpose as surfaces 60 of members 45 and 46.

Figure 7:
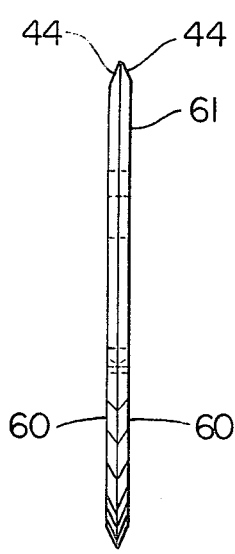

The members 45 and 46 and 61 illustrated in FIGS. 5, 6 and 7 have been shown with three pairs, two pairs, and one pair respectively of belt element supporting side walls. It will be appreciated that an annular member similar to the members 45, 46 and 61 may be provided with any desired number of pairs of belt element supporting side walls. In addition, it will be appreciated that members 45, 46, 61, and similar members may be utilized in any desired combination to define an associated pulley having any desired number of grooves which may correspond to the number of elements or ribs 37 of a V-ribbed belt to be used therewith.

The pulleys 21 and 22 have V-shaped grooves 40 which have 40° angle between surfaces defining such groove. As mentioned earlier, the side flanges 41 have surfaces 42 inclined at an angle of 20° from a referenced plane RP making it possible to use the side flanges 41 to define pulleys for V-ribbed belts having any standard cross section H, J, K, L, and M. To emphasize this point the pulley 22 is illustrated using side flanges 41 and with its rib means 43 dimensioned to receive a K type V-ribbed belt while a pulley P shown in FIG. 9 also uses side flanges 41 and its rib means 43 are dimensioned to receive an L type V-ribbed belt.

Figure 9:
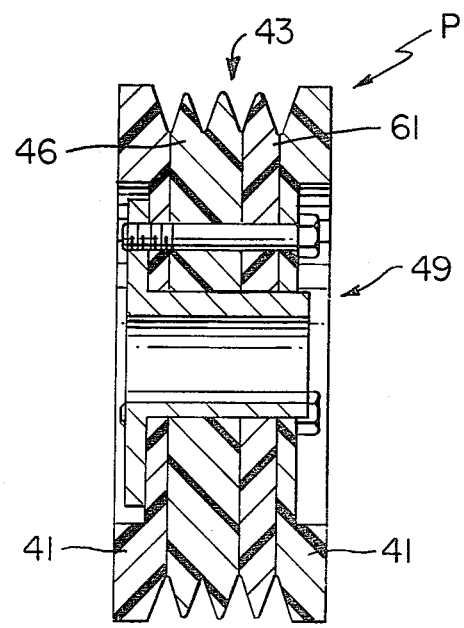
FIG. 9 is a view similar to FIG. 3 illustrating another exemplary embodiment of a pulley of this invention which may be used in a power transmission system similar to the power transmission system of FIG. 1.

The pulley P of FIG. 9 also has fastening means 49 which are identical to the fastening means 49 of the pulley 22. In addition, the pulley P has its side flanges 41 and members 46 and 61 thereof made of a suitable hard plastic material and this is indicated by the cross hatching in FIG. 9.

The fastening means 49, including all component portions thereof, may be made of a suitable hard plastic material instead of metal. Also, the metallic material used in making components of the pulley of this invention may be any suitable metallic material known in the art.

The 40° V-shaped grooves 40 defining the pulley of this invention are made with a standard manufacturing tolerance and such tolerance is set forth in the above identified Engineering Standard IP-26.

While the present exemplary embodiments of this invention, and methods of practicing the same, have been illustrated and described, it will be recognized that this invention may be otherwise variously embodied and practiced within the scope of the following claims.

What is claimed is:

1. In a pulley having a plurality of annular grooves for receiving a V-ribbed endless polymeric power transmission belt which has a corresponding plurality of V-shaped belt elements, said pulley comprising a pair of annular side flanges each having a belt element supporting side wall and annular rib means between said flanges, each said flange having opposed sides one of which is disposed outboard of said rib means and the other of which is disposed adjacent said rib means, said rib means having belt element support side walls; the improvement in which said side flanges are separate substantially identical parts which are fully interchangeable on said pulley from side to side and have substantially equal diameters that are larger than the diameter of said rib means, said rib means comprising at least one disc-like annular member disposed in sandwiched relation between said other sides of said side flanges, each said flange having a recess in said one side thereof, and means detachably fastening said side flanges and rib means together to define said pulley; said fastening means comprising openings through said side flanges and rib means which are disposed in aligned relation, a hub member having a tubular central portion extending through a central bore in each of said flanges and rib means, said hub member having a hub flange provided with a plurality of threaded openings therein, and a plurality of fastening members extending through said openings in said side flanges and rib means, said fastening members having threaded outer ends being threadedly received within the threaded openings of said hub flange, said fastening means having outer end portions of said fastening members confined within said recess of one of said side flanges and said hub flange of said hub confined within said recess of the other of said side flanges whereby said fastening means is completely disposed inboard of said one sides of said side flanges.

2. A pulley as set forth in claim 1 in which said rib means comprises an annular member having at least one pair of belt element supporting side walls.

3. A pulley as set forth in claim 1 in which said rib means comprises an annular member having a plurality of pairs of belt element supporting side walls.

4. A pulley as set forth in claim 1 in which said rib means comprises a plurality of annular members each having at least one pair of belt element supporting side walls.

5. A pulley as set forth in claim 1 in which said hub member and bolts are made of metallic material and said tubular portion of said hub member has a keyway therein disposed parallel to the longitudinal axis of said tubular portion.

6. A pulley as set forth in claim 1 in which one of said rib means and side flanges is made of a synthetic plastic material.

7. A pulley as set forth in claim 1 in which said disc-like member has a pair of planar parallel surfaces defining opposite sides thereof.

8. A pulley as set forth in claim 1 in which said rib means comprises a plurality of annular members each having a plurality of pairs of belt element supporting side walls.

9. A pulley as set forth in claim 1 in which each of said belt element supporting side walls of each flange is disposed at an inclined angle of 20° from a reference vertical plane, each belt element supporting side wall of said rib means is also disposed at an inclined angle of 20° from said reference plane, and said rib means has a perpendicular distance between parallel planes extending through the base portion of each adjoining pair of belt element supporting side walls which is equal to and defines the spacing between immediately adjacent grooves of said pulley.

10. A pulley as set forth in claim 9 in which said perpendicular distance is within a distance range defining a plurality of pulley groove spacings yet said flanges are useable with different rib means wherein each rib means is for a corresponding belt having a corresponding different spacing.

* * * * *